(12) United States Patent
Ots et al.

(10) Patent No.: US 10,239,485 B2
(45) Date of Patent: Mar. 26, 2019

(54) BELT BUCKLE DEVICE FOR A SEAT BELT

(71) Applicant: Autoliv Development AB, Vårgårda (SG)

(72) Inventors: Aidu Ots, Saue (EE); Larissa Melnikova, Tallinn (EE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/509,740

(22) PCT Filed: Sep. 23, 2015

(86) PCT No.: PCT/EP2015/071852
§ 371 (c)(1),
(2) Date: Mar. 8, 2017

(87) PCT Pub. No.: WO2016/046255
PCT Pub. Date: Mar. 31, 2016

(65) Prior Publication Data
US 2017/0297527 A1 Oct. 19, 2017

(30) Foreign Application Priority Data
Sep. 25, 2014 (DE) .......... 10 2014 219 412

(51) Int. Cl.
*B60R 22/03* (2006.01)
*B60R 22/02* (2006.01)
*B60R 22/18* (2006.01)

(52) U.S. Cl.
CPC ........ *B60R 22/03* (2013.01); *B60R 2022/021* (2013.01); *B60R 2022/1806* (2013.01)

(58) Field of Classification Search
CPC ............ B60R 22/03; B60R 2022/1806; B60R 2022/021
See application file for complete search history.

(56) References Cited

U.S. PATENT DOCUMENTS

| 4,892,331 A | * | 1/1990 | Wollner | ................ B60R 22/201 |
| | | | | 280/801.2 |
| 6,568,758 B1 | * | 5/2003 | Berg | ........................ B60N 2/23 |
| | | | | 297/362.12 |

(Continued)

FOREIGN PATENT DOCUMENTS

| DE | 10 2011 011780 A1 | 8/2012 |
| DE | 10 2011 011777 A1 | 9/2012 |

(Continued)

OTHER PUBLICATIONS

Search Report and Written Opinion dated Dec. 14, 2015.
German Exam Report dated Jul. 15, 2015.

*Primary Examiner* — Darlene P Condra
(74) *Attorney, Agent, or Firm* — Brinks Gilson & Lione

(57) ABSTRACT

A belt buckle device (1) for a seat belt including a belt buckle, a drive device (2) coupled or coupleable to the belt buckle, threaded sleeve (5) coupled or coupleable to the belt buckle, a guide part (12) attachable fixed with respect to the vehicle for guiding the threaded sleeve (5) and for supporting the threaded spindle (10), wherein a support plate (9) is provided on the threaded spindle (10) in the axial direction of the threaded spindle (10), which support plate (9) is not displaceable by a tensile force exerted by the belt buckle, via which support plate (9) the threaded spindle (10) is supported in the axial direction on a first thrust support (6) of the guide part (12) to take up tensile forces exerted by the belt buckle.

4 Claims, 2 Drawing Sheets

(56) References Cited

U.S. PATENT DOCUMENTS

| | | | |
|---|---|---|---|
| 6,575,421 B1 * | 6/2003 | Houston | B60N 2/0224 248/429 |
| 2008/0196965 A1 * | 8/2008 | Oberle | B60N 2/929 180/384 |
| 2012/0299282 A1 * | 11/2012 | Holbein | B60R 22/03 280/806 |
| 2013/0032653 A1 * | 2/2013 | Holbein | B60R 22/03 242/390 |
| 2015/0203069 A1 * | 7/2015 | Hoika | B60R 22/03 280/807 |

FOREIGN PATENT DOCUMENTS

| | | |
|---|---|---|
| DE | 10 2012 017979 A1 | 3/2014 |
| DE | 10 2013 018 048 A1 | 5/2015 |

* cited by examiner

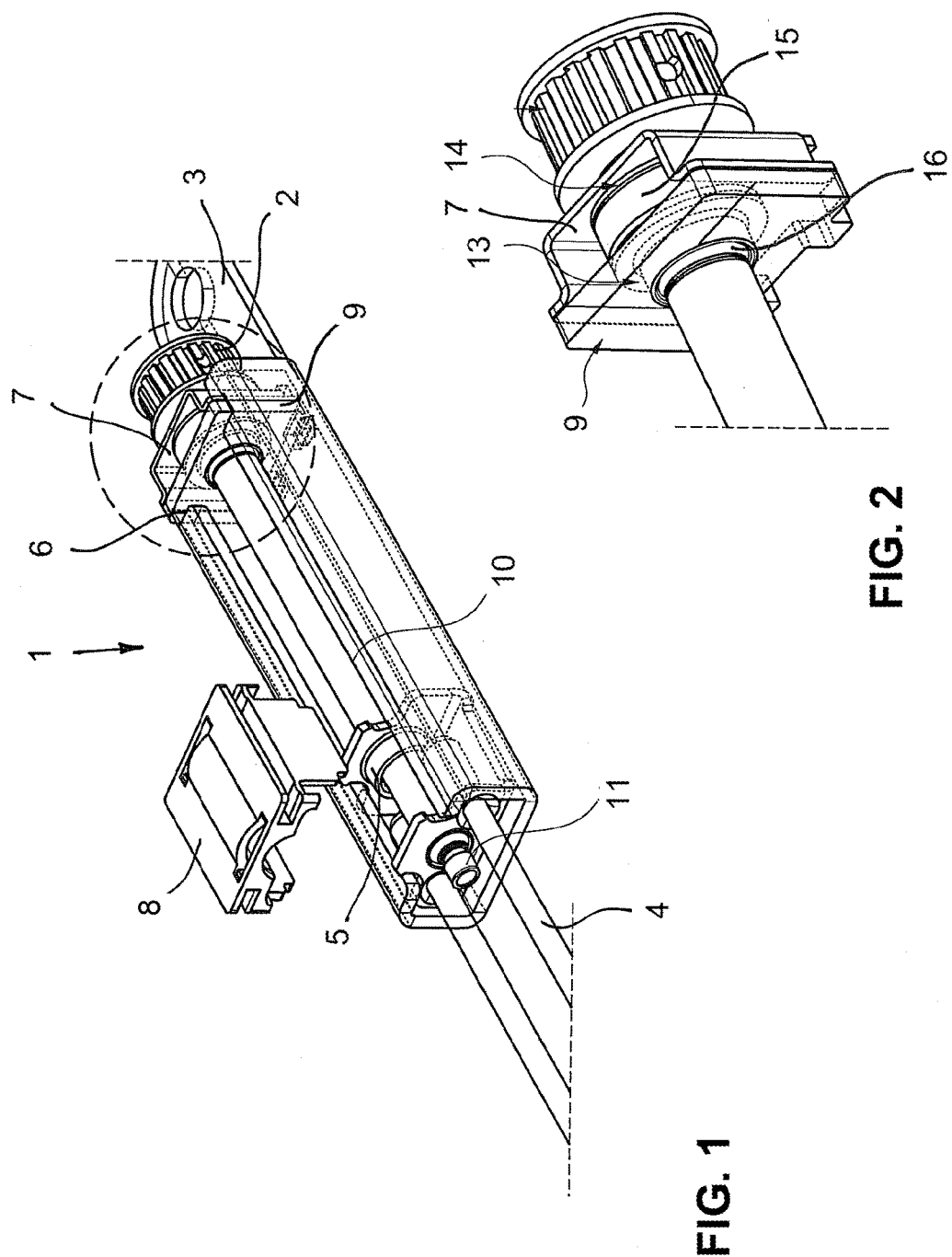

BELT BUCKLE DEVICE FOR A SEAT BELT

CROSS REFERENCE TO RELATED APPLICATIONS

This application claims priority to German Patent Application No. 10 2014 219 412.1, filed on Sep. 25, 2014 and PCT/EP2015/071852, filed on Sep. 23, 2015.

FIELD OF THE INVENTION

The invention relates to a belt buckle device for a seat belt having a retractability feature.

BACKGROUND

It is known to provide belt buckle devices for seat belts with drive devices for different purposes, using which the belt buckle can be extended or retracted. If the belt buckle in the set position is, for example, difficult to reach, the drive device can be provided for moving the belt buckle from the set position into an easier-to-reach presentation position. In addition, it is known for the belt buckle to abruptly retract from the set position into a taut position in a pre-accident phase or in an early phase of the accident in order to extract the existing belt slack in the seat belt of the seat belt device. This so-called pretensioning movement can be formed both irreversible using a pyrotechnic drive or preloaded spring, and reversible using an electric motor (for example) as a drive device.

In the case that the drive device is formed by an electric motor, this is designed as an electric motor having small physical size and having a very high rotational speed and a very low rotational inertia. The high rotational speed of the electric motor is useful since sufficiently high forces can be realized by the use of an appropriate transmission. The low inertia of the electric motor thus makes sense, since the high rotational speed of several thousand rotations per minute can thereby be achieved in a very short time of a few milliseconds. One possible embodiment of the transmission is comprised of providing a threaded sleeve on the draw cable of the belt buckle, which threaded sleeve is in engagement with a threaded spindle driven by the electric motor. Since the electric motor can also move the threaded sleeve in different directions by rotational movements in different directions, by using the electric motor as a drive device both the belt-buckle moving function and the tensioning function of the seat belt can be realized.

One problem to be solved is that the restraint force in an accident likewise must be transmitted into the vehicle structure via the threaded sleeve, the spindle, and finally the electric motor such that the shaft drive must be designed for forces that are greater by far than those that would be needed for the belt buckle feed function and the pretensioning function. It is particularly disadvantageous that the electric motor can also be subjected to stress, in particular in the axial direction of the shaft, such that the electric motor must be designed for forces of a magnitude that does not customarily arise during standard operation.

Against this background the object of the invention is to provide a belt buckle device for a seat belt including a drive device and a belt buckle that can be optimally designed for both the transmission of the drive movement of the drive device and for transmitting the restraining force in an accident.

A belt buckle device according to the invention including the features described herein is proposed for achieving the above mentioned object.

SUMMARY AND INTRODUCTORY DESCRIPTION OF THE INVENTION

According to the basic concept of the invention, it is proposed that a support plate be provided on the threaded spindle, which support plate is not displaceable in at least the axial direction of the threaded spindle from a tensile force exerted by the belt buckle, via which support plate the threaded spindle is supported in the axial direction on a first thrust support of the guide part to take up tensile forces exerted via the belt buckle. With the proposed solution, the axial forces arising from the retraction of the belt buckle and in particular pretensioning the seat belt are introduced into the vehicle structure by the threaded spindle via the support plate and the first thrust support such that the drive device itself and the parts between the support plate and the drive device are not stressed by the tensile forces being exerted on the belt buckle. The transmission that transfers the drive movement e.g. can thus be economically manufactured from plastic parts. The service life and the functional reliability of the drive device can moreover be considerably increased and improved owing to the reduced stress.

It is furthermore proposed that the threaded spindle be supported on a second thrust bearing to receive the compressive forces exerted by the belt buckle. This can prevent compressive forces caused by a jamming of the belt buckle from being exerted on the drive device and the components disposed between the second thrust bearing and the drive device upon the extension of the seat belt, for example. The drive device is loaded exclusively by the torque acting during the transmission of the rotary motion and need not be additionally supported or designed in particular to receive possible high axial forces.

The second thrust bearing can moreover be used additionally as a radial bearing and at least to restrict the radial movement of the threaded spindle in that the second thrust bearing has an opening through which the threaded spindle extends. The threaded spindle can furthermore be extended to extend through the second thrust bearing and connect to the drive device.

It is furthermore proposed that the support plate also include an opening through which the threaded spindle can extend. The support plate can also be used having the same advantages as the second thrust bearing for radial supporting of the threaded spindle and moreover can be extended through the support plate.

The suggested axial supporting of the threaded spindle can be simply structurally achieved in particular by including a radial shoulder on the threaded spindle and the shoulder of the threaded spindle overlaying the edge of the opening of the support plate, which edge is directed away from the threaded sleeve and/or the edge of the second thrust bearing, which edge is directed toward the threaded sleeve. Owing to the proposed arrangement, the tensile forces exerted during the retraction of the belt buckle can be received by the second thrust bearing and the compressive forces exerted on the threaded spindle upon the extension of the belt buckle can be received by the support plate and by the first thrust support.

The construction of such a support can be easily designed in particular if the shoulder of the threaded spindle is disposed between the support plate and the second thrust bearing.

The threaded spindle can be particularly well supported if the opening of the support plate and/or the opening of the second thrust bearing engages with a threadless section. An especially large support surface having minimal surface loading can thereby be realized along with the threaded spindle itself and the support surface.

The support can be further improved by supporting the threaded spindle in the opening of the support plate and/or in the opening of the second thrust bearing, each respectively via a friction-reducing bearing insert. The frictional losses and the development of noise during the driving of the threaded spindle can be reduced through this proposed solution. The bearing clearance can furthermore be designed smaller by manufacturing the bearing inserts to have greater dimensional accuracy than the guide part.

BRIEF DESCRIPTION OF THE DRAWINGS

The invention is described in the following using preferred embodiments with reference to the accompanying Figures:

FIG. 1 shows a section of a belt buckle device according to the invention in an oblique view;

FIG. 2 shows an enlarged section of the threaded spindle including the radial shoulder and the support plate.

DETAILED DESCRIPTION OF THE INVENTION

Figure 3:
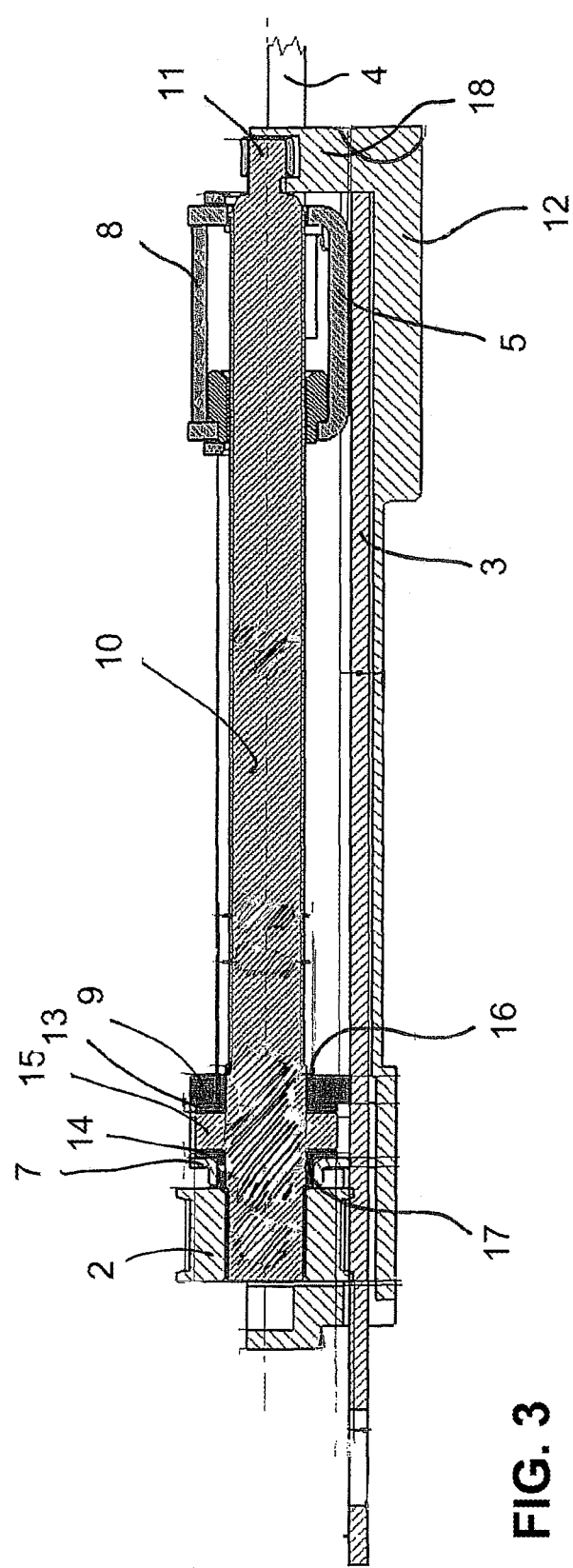
FIG. 3 shows a sectional view of FIG. 1.

In FIG. 1, a section of a belt buckle device 1 according to the invention and a drive device 2 can be seen, wherein the belt buckle itself must be envisaged and only the drive gear of the drive device 2 is illustrated. However, the drive device 2 itself of course is part of a unit generating the drive movement such as produced using an electric motor, for example, which unit drives for example the drive gear, e.g., via a toothed belt or a gear transmission.

The belt buckle device 1 furthermore includes a threaded spindle 10 connected to the drive device 2 for rotation therewith, a guide part 12, a fastening component 3 that is rigidly connected to the guide part 12 for attachment to a vehicle structure, and a threaded sleeve 5 fixed to the guide part 12, in which threaded sleeve 5 the threaded spindle 10 engages with the threads. The threaded sleeve 5 is for its part connected to a draw cable 4 in a manner fixed with respect to tension and compression. In the instance that the drive device 2 is activated, the threaded spindle 10 is rotationally driven via the drive gear such that the threaded sleeve 5 is moved in a linear direction, dependent on the direction of rotation of the threaded spindle 10, away from or toward the drive gear, and the belt buckle is either retracted or extended by the draw cable 4. The threaded sleeve 5 is formed as a U-shaped punched part including a thread insert and covered toward the exterior by a trim cover 8.

The threaded spindle 10 is supported with a threadless support extension 11 on an upright bearing flange 18 of the guide part 12 and furthermore includes a radial shoulder 15 disposed adjacent to the end connected to the drive gear. A first thrust support 6 is provided on the guide part 12, a support plate 9 being supported on said first thrust support 6. The support plate 9 has an opening 16 in which the threaded spindle 10 is supported with a first friction-reducing bearing insert 13. A second thrust bearing 7 is furthermore provided in the form of a formed part attached to the exterior of the guide part 12, which formed part likewise has an opening 17 in which the threaded spindle 10 is supported with a second friction-reducing bearing insert 14. The threaded spindle 10 thus engages both openings 16 and 17 in the second thrust bearing 7 and in the support plate 9, and the radial shoulder 15 is disposed between the second thrust bearing 7 and the support plate 9 or the first thrust support 6. In other words, this means that the threaded spindle with the radial shoulder 15 overlays the edge of the opening 16 of the support plate 9, which edge is directed away from the threaded sleeve 5, and overlays the edge of the opening 17 of the second thrust bearing 7, which edge is directed toward the threaded sleeve 5.

This proposed solution allows the threaded spindle 10 to be supported during the drive movement, depending on the direction of rotation, in the axial direction either on the second thrust bearing 7 or on the first thrust support 6 via the support plate 9. Provided that the belt buckle should be retracted, the threaded spindle 10 will be driven in a direction of rotation in which the threaded sleeve 5 in the representation in FIG. 3 will be moved to the left. In this instance, the threaded spindle 10 is supported via the support plate 9 on the first thrust support 6. In the instance that the belt buckle is to be extended, the threaded spindle 10 is driven in the other direction of rotation such that the threaded sleeve 5 in the representation of FIG. 3 is moved to the right. In this case, the threaded spindle 10 supports itself via the second thrust bearing 7 on the guide part 12. The first thrust support 6 with the adjoining support plate thus has an intentionally stiffer design since the anticipated axial forces arising during the retraction movement, that is during the tensioning of the seat belt strap, are generally greater than the axial forces arising during the extension of the seat belt strap, provided that the movement of the belt buckle is not disturbed by jammed objects or other external circumstances.

The threaded spindle 10 has a threadless design in those sections in which it engages with the openings 16 and 17, which can, however, also be achieved through the insertion of the threadless bearing inserts 13 and 14 such that the load on the bearing is reduced and the rotational movement is not disrupted.

The advantage of the proposed solution is evident in that the axial forces exerted on the threaded spindle are intentionally introduced into the guide part 12 and from there into the vehicle structure. It is thereby possible to prevent stressing the drive device 2 with axial forces. It furthermore evidently allows for improved support of the threaded spindle 10 in the radial and axial directions.

While the above description constitutes the preferred embodiment of the present invention, it will be appreciated that the invention is susceptible to modification, variation and change without departing from the proper scope and fair meaning of the accompanying claims.

The invention claimed is:

1. A belt buckle device for moving a seat belt buckle of a seat belt system for a vehicle comprising;
   a drive device adapted to be coupled to the belt buckle,
   a threaded spindle rotationally driveable about its longitudinal axis by the drive device, the threaded spindle engages a thread of a threaded sleeve adapted to be coupled to the belt buckle, the threaded spindle includes a radial shoulder,
   a guide part attachable fixed with respect to the vehicle for guiding the threaded sleeve and for supporting the threaded spindle,
   a support plate provided on the threaded spindle in the axial direction of the threaded spindle, which support plate is not displaceable by a tensile force exerted by the belt buckle, the support plate and the threaded spindle are supported in the axial direction on a first thrust support of the guide part to take up the tensile force exerted by the belt buckle, and the threaded spindle is supported on a second thrust bearing to take up a compressive force exerted by the belt buckle, the second thrust bearing includes a first opening through which the threaded spindle extends and forms a first edge, the radial shoulder of the threaded spindle overlays a second edge of a second opening of the support plate through which the threaded spindle extends, the second edge is directed away from the threaded sleeve, or overlays the first edge of the second thrust bearing, and the first edge is directed toward the threaded sleeve.

2. The belt buckle device according to claim 1 further comprising;

the radial shoulder of the threaded spindle is disposed between the support plate and the second thrust bearing.

3. The belt buckle device according to 1 further comprising;

the threaded spindle engages the second opening of the support plate or the first opening of the second thrust bearing with a threadless section.

4. The belt buckle device according to claim 1 further comprising;

the threaded spindle is supported in the second opening of the support plate or in the first opening of the second thrust bearing, by a friction-reducing bearing insert.

* * * * *